(12) United States Patent
Kobayashi et al.

(10) Patent No.: US 7,597,180 B2
(45) Date of Patent: *Oct. 6, 2009

(54) FRICTION PLATE FOR WET-TYPE MULTIPLATE CLUTCH

(75) Inventors: Masahiro Kobayashi, Fukuroi (JP); Tsuyoshi Hirayanagi, Fukuroi (JP); Ritsuo Toya, Fukuroi (JP); Masahiro Yamada, Fukuroi (JP); Hirokazu Hino, Fukuroi (JP)

(73) Assignee: NSK-Warner K.K., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/964,166

(22) Filed: Dec. 26, 2007

(65) Prior Publication Data

US 2008/0185256 A1 Aug. 7, 2008

(30) Foreign Application Priority Data

Feb. 6, 2007 (JP) .............................. 2007-026220

(51) Int. Cl.
*F16D 13/74* (2006.01)
(52) U.S. Cl. ............................... 192/107 R; 192/113.36
(58) Field of Classification Search ............. 192/113.36
See application file for complete search history.

(56) References Cited

U.S. PATENT DOCUMENTS 3,534,842 A * 10/1970 Davison, Jr. ........... 192/113.36
4,667,534 A * 5/1987 Kataoka ..................... 475/160
6,062,367 A 5/2000 Hirayanagi et al.
6,318,534 B1 * 11/2001 Zimprich ................. 192/70.12
7,014,027 B2 * 3/2006 Adair et al. ............ 192/113.36
7,172,062 B2 2/2007 Kitahara et al.
2007/0017773 A1 1/2007 Suzuki et al.
2007/0102258 A1 * 5/2007 Miyazaki et al. ........ 192/113.36
2007/0199794 A1 8/2007 Miyazaki et al.

FOREIGN PATENT DOCUMENTS

JP 11-141570 5/1999
JP 2005-076759 3/2005

* cited by examiner

*Primary Examiner*—Richard M. Lorence
(74) *Attorney, Agent, or Firm*—Cermak Kenealy Vaidya & Nakajima LLP

(57) ABSTRACT

A friction plate for a wet-type multiplate clutch is provided with a core plate and friction linings bonded on opposite sides of the core plate, respectively. Each of the friction linings is composed of plural segment pieces bonded at angular intervals on the corresponding one of said opposite sides. The segment pieces each have at least one first oil groove and at least one second oil groove. The first oil groove opens to a radially-inner side of its corresponding segment piece and has a closed end portion located in a radially-intermediate part of the corresponding segment piece, and the second oil groove opens to a radially-outer side of the corresponding segment piece and has a closed end portion located in another radially-intermediate part of the corresponding segment piece. The segment pieces are each provided in a friction surface thereof with at least one oil pocket closed at a circumference thereof.

3 Claims, 4 Drawing Sheets

FRICTION PLATE FOR WET-TYPE MULTIPLATE CLUTCH

CROSS-REFERENCE TO RELATED APPLICATION

This application claims the priority of Japanese Patent Application 2007-026220 filed Feb. 6, 2007, which is incorporated herein by reference.

FIELD OF THE INVENTION

This invention relates to a friction plate for a wet-type multiplate cutch useful as a clutch, a brake or the like in an automatic transmission.

BACKGROUND OF THE INVENTION

FIG. 1 is a cross-sectional view illustrating the fundamental construction of a wet-type multiplate clutch 10. FIG. 1 shows a clutch casing 21, a counterpart hub 22 to which a torque is transmitted, a spline groove 23 formed on the clutch casing 21, a spline groove 24 formed on the hub 22, a piston 25 for pressing separator plates 30 and friction plates 40 against a backing plate 26, a snap ring 27 supporting the backing plate 26, and a sealing ring 28 for the piston 25. The separator plates 30 are maintained in fitting engagement with the spline groove 23, while the friction plates 40 are maintained in fitting engagement with the spline groove 24.

In recent years, there is an ever-increasing demand for improvements in the fuel economy of automobiles. Keeping in step with this trend, there is an outstanding demand for a further reduction in drag toque between friction plates and separator plates during non-engagement of a clutch in an automatic transmission.

Conventional clutches are equipped with friction plates provided with friction linings, each of which has one or more oil grooves having closed end portions to separate the friction plates from their associated separator plates during non-engagement of a clutch and also has one or more oil passages extending radially through the friction lining to feed lube oil onto a friction surface for the prevention of seizure during engagement of the clutch.

To improve the shift response in an attempt to make not only an improvement in fuel economy and but also improvements in engine performance, the clearances between friction plates and their associated separator plates have become smaller recently than before, tending to result in a greater drag torque due to intervening oil films during idling.

With such conventional friction plates, no sufficient drainage of lube oil is feasible on their friction surfaces, thereby failing to satisfactorily meet the demand for a further reduction in drag torque. Especially during rotation in a low-speed range, the drainage of intervening lube oil between the friction plates and the associated separator plates is not sufficient so that the drag torque cannot be reduced.

Lube oil is fed from the radially-inner side of friction plates. Once it enters between the friction plates and their associated separator plates, its drainage does not take place quickly. Especially when the clearances between the friction plates and the separator plates are small and the clutch is in a low rpm range, this tendency is pronounced so that a significant drag torque is produced due to the viscosity of the lube oil between the friction linings and their counterpart separator plates.

When the friction surface of each friction lining is provided with plural second oil grooves opening to a radially-outer side of the friction lining (hereinafter called "second oil grooves"), lube oil which has been drawn onto the friction surface from an oil way is smoothly drained to the radially-outer side so that during idling, a drag torque can be reduced. This drag-torque reducing effect is high especially during low-speed rotation. Because the drawn lube oil is smoothly drained, frictional heat which is produced during clutch engagement is also removed smoothly together with the lube oil, so that the heat resistance of the friction lining is improved.

When the friction surface of each friction lining is provided with plural oil grooves opening to a radially-inner side of the friction lining and having closed radial outer end portions (hereinafter called "first oil grooves"), these oil grooves are effective in keeping uniform the clearances between the friction plates and their associated separator plates during idling owing to the action that separate the friction plates and the separator plates from each other and, when the clutch is disengaged, can smoothly separate the friction plates and the separator plates from each other. These oil grooves are, therefore, also effective in reducing a drag torque during idling.

When a friction lining having these oil grooves is formed into segment pieces and these segment pieces are bonded at angular intervals on one side of a core plate, oil passages are formed between the respective segment pieces such that the oil passages extend through the friction lining from the radially-inner side to the radially-outer side. Accordingly, any extra lube oil is promptly drained, thereby effectively reducing a drag torque during idling. (See, for example, JP-A-11-141570 and JP-A-2005-76759)

In an initial stage of clutch engagement, however, the lube oil which exists on each friction surface is quickly drained from the friction surface via these oil grooves and oil passages, and therefore, the cushioning effect of the lube oil is reduced to cause abrupt grabbing of the clutch in the initial stage of clutch engagement. The use of this clutch as a clutch, a brake or the like in an automatic transmission causes a problem that a shock is produced when the automatic transmission is shifted.

SUMMARY OF THE INVENTION

There is, accordingly, an ever-increasing need for a wet-type multiplate clutch to avoid grabbing in an initial stage of engagement while reducing a drag torque during idling of the clutch, as mentioned above.

To solve the above-described problem, the present invention provides a friction plate for a wet-type multiplate clutch, said friction plate being provided with a core plate and friction linings bonded on opposite sides of the core plate, respectively, each of said friction linings being composed of plural segment pieces bonded at angular intervals on the corresponding one of said opposite sides, said segment pieces each having at least one first oil groove and at least one second oil groove, said first oil groove opening to a radially-inner side of its corresponding segment piece and having a closed end portion located in a radially-intermediate part of the corresponding segment piece, and said second oil groove opening to a radially-outer side of the corresponding segment piece and having a closed end portion located in another radially-intermediate part of the corresponding segment piece, wherein the segment pieces are each provided in a friction surface thereof with at least one oil pocket closed at a circumference thereof.

With the friction plate according to the present invention, the lube oil in the oil pocket produces cushioning effect in an initial stage of clutch engagement, thereby making it possible to avoid grabbing in the initial stage of clutch engagement.

The present invention has made it possible, with the above-described relatively simple construction, to avoid grabbing in an initial stage of clutch engagement while keeping a drag torque small during idling, even under such a lubrication environment that lots of lube oil are fed.

DETAILED DESCRIPTION OF THE INVENTION AND PREFERRED EMBODIMENTS

Each oil groove opening to the radially-outer side (i.e., the second oil groove) has oil-draining effect. Its oil drainage increases when its angular width is made greater from its closed end portion toward the radially-outer side.

Each oil groove opening to the radially-inner side (i.e., the first oil groove) is effective in separating the friction plate and its associated separator plate from each other, and this effect to separate the friction plate and the separator plate from each other becomes greater when its angular width is made narrower from its open end portion toward its closed end portion.

The shapes of the oil pocket and the first and second oil grooves can be appropriately determined depending upon the friction surface area, friction characteristics, lube-oil feed rate, and so on.

Figure 1:
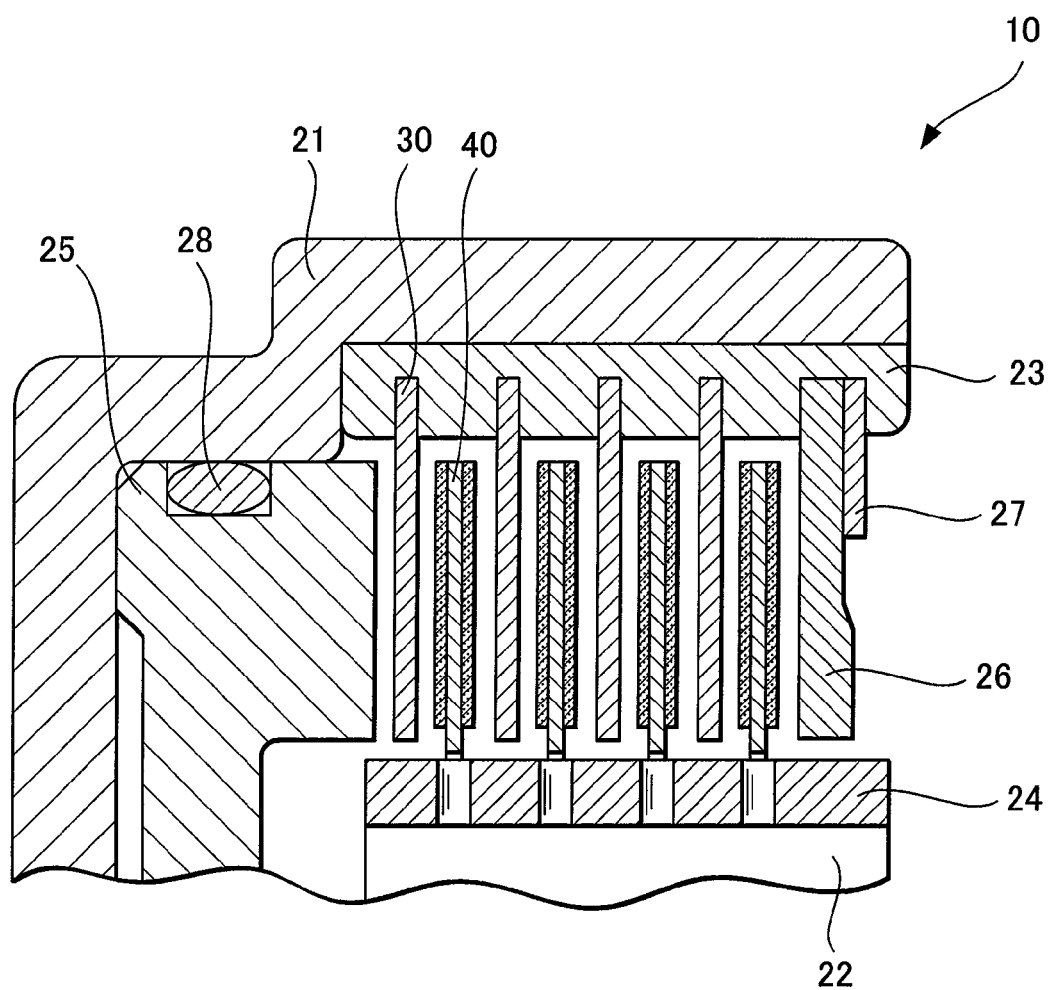
FIG. 1 is a cross-sectional view illustrating the fundamental construction of a wet-type multiplate clutch.
Figure 2:
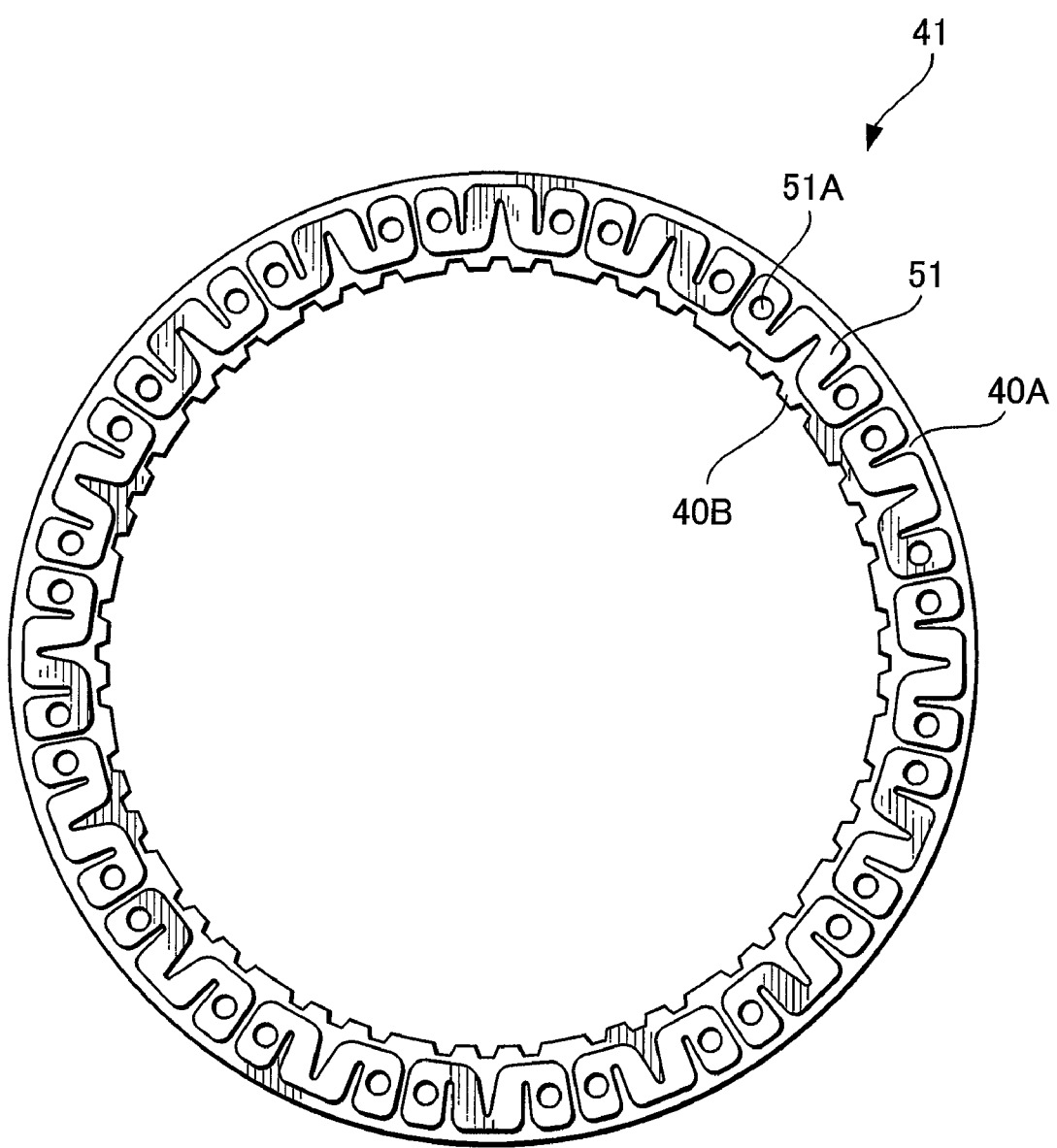
FIG. 2 is a front view of a friction plate according to a first embodiment of the present invention.
Figure 3:
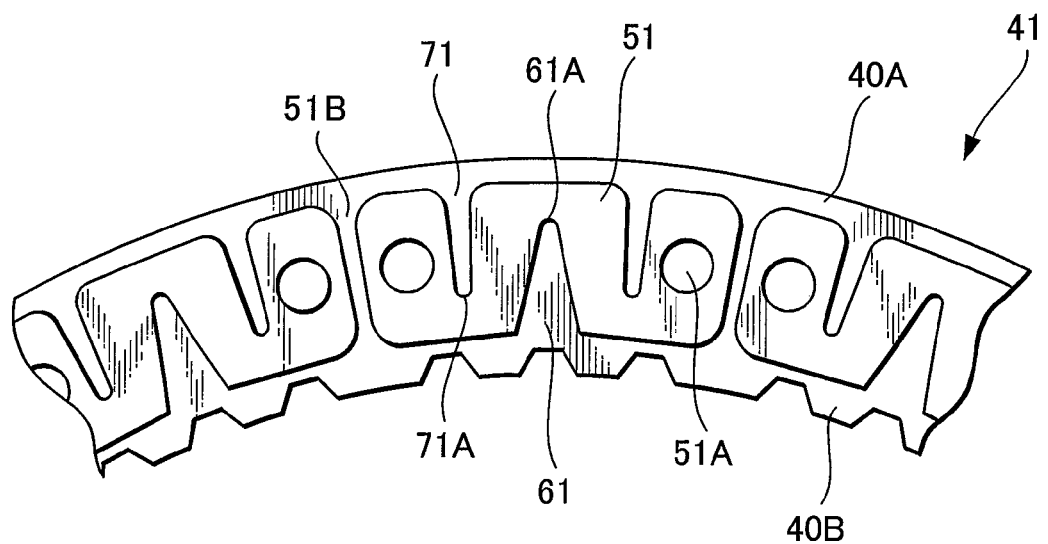
FIG. 3 is an enlarged fragmentary front view of the friction plate of FIG. 2.

Certain preferred embodiments of the present invention will hereinafter be described with reference to the accompanying drawings. FIG. 2 is a front view of a friction plate 41 according to the first embodiment of the present invention. FIG. 3 is an enlarged fragmentary view of the friction plate 41 of FIG. 2, and shows a core plate 40A, segment pieces 51 of a friction lining, and spline teeth 40B to be maintained in fitting engagement with the spline groove 24 formed on the hub 22.

Sign 51A indicates oil pockets formed in each segment piece 51. As shown in the figures, these oil pockets 51A are closed at their circumferences, and are in communication with neither oil passages 51B between the segment piece 51 and its adjacent segment pieces 51, 51 nor the first oil groove 61 opening to the radially-inner side or the second oil grooves 71 opening to the radially-outer side.

The lube oil in the oil pockets 51A of each segment piece 51 exhibits cushioning effect to avoid grabbing in an initial stage of clutch engagement. In the illustrated first embodiment, the first oil groove 61 and the second oil grooves 71 each have a radial width which increases from its closed end portion toward its open end portion. Further, the closed end portion 61A of the first oil groove 61 and the closed end portions 71A of the second oil grooves 71 are located beyond the radial center line of the friction lining. The action and effect of each of the first and second oil grooves can be further enhanced when the first and second oil grooves are constructed as described above.

Figure 4:
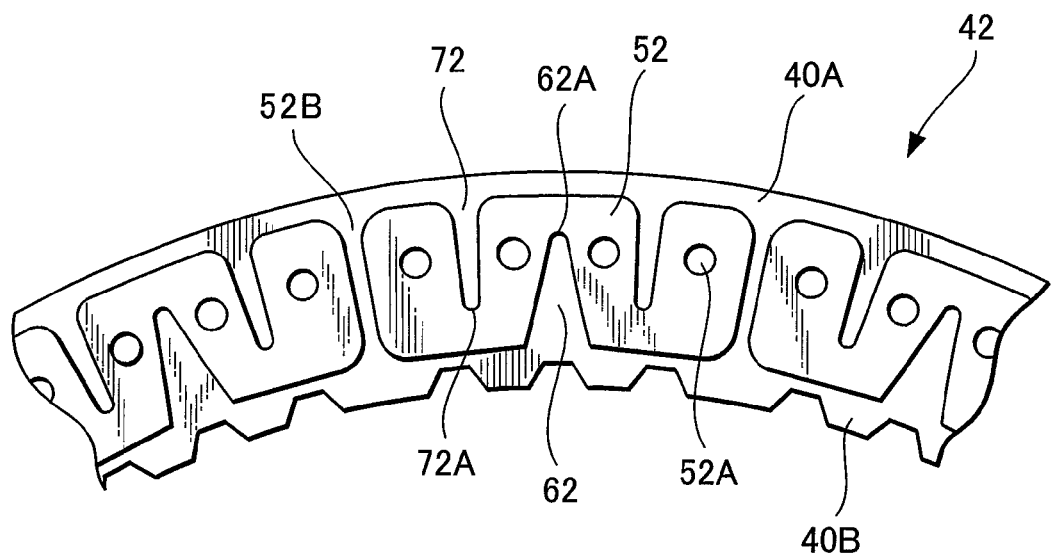
FIG. 4 is similar to FIG. 3, but illustrates a friction plate according to a second embodiment of the present invention.

FIG. 4 is a view similar to FIG. 3, but depicts a friction plate 42 according to the second embodiment of the present invention. Signs 40A, 40B, 52, 52A, 52B, 62, 62A, 72 and 72A in FIG. 4 correspond to the signs 40A, 40B, 51, 51A, 51B, 61, 61A, 71 and 71A in FIG. 3. The second embodiment is different from the first embodiment in that the number of the oil pockets 52A in each segment piece 52 has been increased from 2 to 4.

Figure 5:
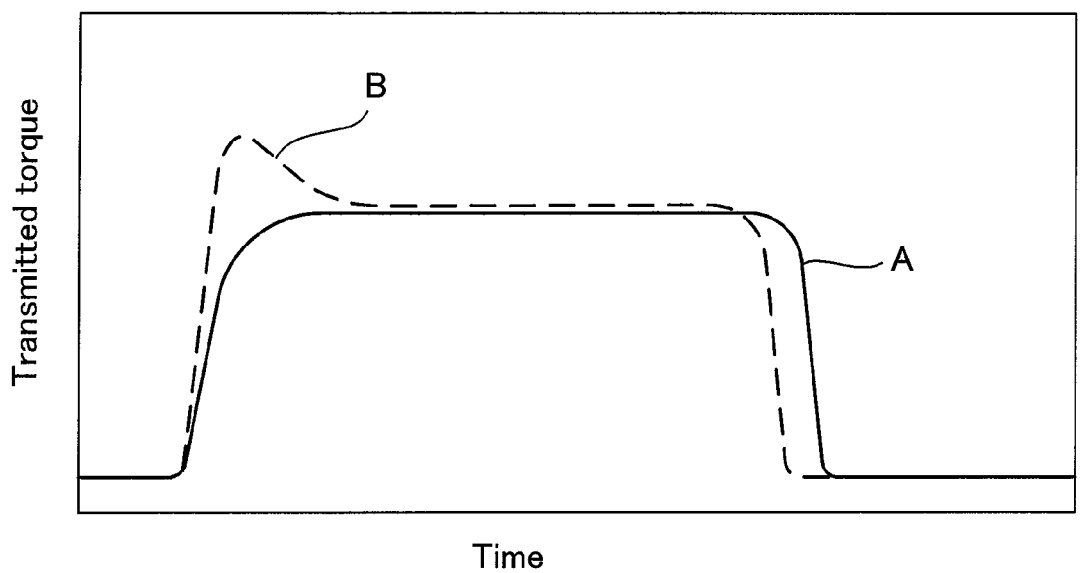
FIG. 5 is a graph illustrating advantageous effects of the present invention.

FIG. 5 diagrammatically illustrates advantageous effects of the present invention, in which transmitted torque is plotted along the ordinate while time is plotted along the abscissa. A broken line B shows torque-time characteristics of a conventional clutch, while a solid line A illustrates torque-time characteristics of a clutch equipped with friction plates according to the present invention. FIG. 5 indicates that in the conventional clutch, grabbing takes place in an initial stage of clutch engagement and that in the clutch equipped with friction plates according to the present invention, a transmitted torque is uniform.

The invention claimed is:

1. A friction plate for a wet-type multiplate clutch, said friction plate being provided with a core plate and friction linings bonded on opposite sides of said core plate, respectively, each of said friction linings being composed of plural segment pieces bonded at angular intervals on the corresponding one of said opposite sides, said segment pieces each having at least one first oil groove and at least one second oil groove, said first oil groove opening to a radially-inner side of its corresponding segment piece and having a closed end portion located in a radially-intermediate part of the corresponding segment piece, and said second oil groove opening to a radially-outer side of the corresponding segment piece and having a closed end portion located in another radially-intermediate part of the corresponding segment piece, wherein:

said segment pieces are each provided in a friction surface thereof with at least one oil pocket closed at a circumference thereof.

2. A friction plate according to claim 1, wherein said at least one second oil groove becomes narrower from an open end portion thereof toward said closed end portion thereof.

3. A friction plate according to claim 1, wherein said closed ends of said at least one first oil groove and at least one second oil groove are located beyond a radial center line of the corresponding segment piece, respectively.

* * * * *